(12) United States Patent
Tsuda

(10) Patent No.: US 12,004,241 B2
(45) Date of Patent: Jun. 4, 2024

(54) BASE STATION DEVICE, WIRELESS COMMUNICATION DEVICE, AND WIRELESS COMMUNICATION SYSTEM

(71) Applicant: SONY GROUP CORPORATION, Tokyo (JP)

(72) Inventor: Shinichiro Tsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 254 days.

(21) Appl. No.: 17/309,877

(22) PCT Filed: Oct. 21, 2019

(86) PCT No.: PCT/JP2019/041351
§ 371 (c)(1),
(2) Date: Jun. 25, 2021

(87) PCT Pub. No.: WO2020/144912
PCT Pub. Date: Jul. 16, 2020

(65) Prior Publication Data
US 2022/0053581 A1    Feb. 17, 2022

(30) Foreign Application Priority Data
Jan. 10, 2019 (JP) ................................. 2019-002390

(51) Int. Cl.
*H04W 76/11* (2018.01)
*H04W 84/04* (2009.01)
*H04W 88/08* (2009.01)

(52) U.S. Cl.
CPC .......... *H04W 76/11* (2018.02); *H04W 84/045* (2013.01); *H04W 88/08* (2013.01)

(58) Field of Classification Search
CPC .............................. H04W 76/11; H04W 88/08
(Continued)

(56) References Cited

U.S. PATENT DOCUMENTS

2010/0248717 A1    9/2010   Eerolainen
2012/0100848 A1    4/2012   Miklos
(Continued)

FOREIGN PATENT DOCUMENTS

CN    101669385 A    3/2010
CN    102711282 A    10/2012
(Continued)

OTHER PUBLICATIONS

International Search Report and Written Opinion of PCT Application No. PCT/JP2019/041351, dated Jan. 7, 2020, 10 pages of ISRWO.

*Primary Examiner* — Ted M Wang
(74) *Attorney, Agent, or Firm* — CHIP LAW GROUP

(57) ABSTRACT

A private network is flexibly built while ensuring physical or logical separation from a public network. A base station device notifies system information including a first identifier corresponding to a communication network (for example, PLMN) in an identifier list. In that state, a second identifier used locally is added to the identifier list of the system information according to control information from a control device. Thereafter, notification of the system information including the first and second identifiers in the identifier list is started. Therefore, the private network is built.

15 Claims, 13 Drawing Sheets

(58) Field of Classification Search
USPC .................................................... 455/422.1
See application file for complete search history.

(56) References Cited

U.S. PATENT DOCUMENTS

| | | |
|---|---|---|
| 2017/0353851 A1 | 12/2017 | Gonzalez |
| 2018/0103416 A1 | 4/2018 | Brown et al. |
| 2019/0159117 A1* | 5/2019 | Kuge ................... H04W 48/17 |
| 2019/0261447 A1* | 8/2019 | Fujishiro .............. H04W 76/30 |

FOREIGN PATENT DOCUMENTS

| | | |
|---|---|---|
| CN | 103947259 A | 7/2014 |
| CN | 104066074 A | 9/2014 |
| CN | 104780531 A | 7/2015 |
| CN | 105981432 A | 9/2016 |
| CN | 106165466 A | 11/2016 |
| EP | 2445244 A | 4/2012 |
| EP | 3089519 A1 | 11/2016 |
| GB | 2551939 A | 1/2018 |
| JP | 2004112793 A | 4/2004 |
| JP | 2008523701 A | 7/2008 |
| JP | 2017034470 A | 2/2017 |
| JP | 2018-530262 A | 10/2018 |
| WO | WO-2013075527 A1 | 5/2013 |
| WO | 2016/151041 A1 | 9/2016 |
| WO | 2017/067568 A1 | 4/2017 |

\* cited by examiner

FIG. 12

| SET | START NUMBER (MCC-MNC) | END NUMBER (MCC-MNC) |
|---|---|---|
| A | 440-07 | 440-09 |
| B | 440-11 | 440-19 |
| C | 440-22 | 440-29 |
| D | 440-30 | 440-39 |

*FIG. 13*

| SET | SET CONFIGURATION |
|---|---|
| 1 | (A, B, C) |
| 2 | (A, C, D) |
| 3 | (A, B, C, D) |

BASE STATION DEVICE, WIRELESS COMMUNICATION DEVICE, AND WIRELESS COMMUNICATION SYSTEM

CROSS REFERENCE TO RELATED APPLICATIONS

This application is a U.S. National Phase of International Patent Application No. PCT/JP2019/041351 filed on Oct. 21, 2019, which claims priority benefit of Japanese Patent Application No. JP 2019-002390 filed in the Japan Patent Office on Jan. 10, 2019. Each of the above-referenced applications is hereby incorporated herein by reference in its entirety.

TECHNICAL FIELD

The present technology relates to a wireless communication system. Specifically, the present technology relates to a base station device, a wireless communication device, and a wireless communication system that can use a private network.

BACKGROUND ART

The fifth generation mobile communication system (5G) is also expected to be used in an industry (a vertical market) that has not been closely related to the cellular industry. For example, use as the private network in fields such as factory automation (FA) and medical care is one of expected operation forms. As one of means for building the private network, it is conceivable to utilize a concept of RAN sharing (see, for example, Patent Document 1). There are methods for RAN sharing: multi-operator core network) (MOCN) and multiple operator radio access network (MORAN). For example, by making one virtual operator a private connection, it is possible to operate as the private network.

CITATION LIST

Patent Document

Patent Document 1: Japanese Patent Application Laid-Open No. 2018-530262

SUMMARY OF THE INVENTION

Problems to be Solved by t he Invention

By using the above-mentioned conventional RAN sharing, it is possible to operate as the private network. However, there is a problem that a process for building the private network is complicated. Furthermore, it is necessary to ensure physical or logical separation between a public network and the private network.

The present technology has been created in view of such a situation, and aims to flexibly build the private network while ensuring physical or logical separation from the public network.

Solutions to Problems

The present technology has been made to solve the above-mentioned problems, and a first aspect thereof is a base station device in which in a state of notifying system information including a first identifier corresponding to a first communication network in an identifier list, a second identifier used locally is added to the identifier list according to control information from a control device, and notification of the system information including the first and second identifiers in the identifier list is started. Therefore, there is an effect of building the private network corresponding to the second identifier according to the control information from the control device. In this case, the control information may include information associated with the second identifier and a command instructing to add the second identifier to the identifier list.

Furthermore, in the first aspect, in a state of notifying system information including the first and second identifiers in the identifier list, the second identifier may be deleted from the identifier list according to the control information from the control device, and notification of the system information that does not include at least the second identifier in the identifier list may be started. Therefore, there is an effect of releasing the private network corresponding to the second identifier according to the control information from the control device. In this case, the control information may include information associated with the second identifier and a command instructing to delete the second identifier from the identifier list.

Furthermore, in the first aspect, according to the control information, the first identifier may be further deleted from the identifier list, and notification of system information including only the second identifier in the identifier list may be started. Therefore, there is an effect of building an isolated private network corresponding to the second identifier according to the control information from the control device. In this case, the control information may include information associated with the second identifier and a command instructing to add the second identifier to the identifier list and to delete the first identifier from the identifier list.

Furthermore, in the first aspect, an identifier set including a set of identifiers not assigned to the first identifier may be defined in advance, and the second identifier may be autonomously identified from the identifier set. Therefore, there is an effect of building the private network corresponding to the second identifier identified autonomously.

Furthermore, in the first aspect, an identifier set including a set of identifiers not assigned to the first identifier may be defined in advance, it may be detected that any identifier included in the identifier set is not used in surrounding base station devices, and on the basis of the detected result, an identifier not used by the surrounding base station devices may be identified from the identifier set. Therefore, there is an effect of building the private network corresponding to the identifier not used by the surrounding base station devices.

Furthermore, in the first aspect, the base station device may be a relay base station device, and a mobile termination function provided in the relay base station device may establish a wireless backhaul line with a donor base station device so that the base station device is connected to the control device through the wireless backhaul line. Therefore, there is an effect of connecting the base station device to the control device through the wireless backhaul line.

Furthermore, a second aspect of the present technology is a wireless communication system including: a base station device that is connected to a first core network through a first backhaul line, and in which in a state of notifying system information including a first identifier corresponding to a first communication network in an identifier list, a second identifier used locally is added to the identifier list according to control information from a control device, and notification of the system information including the first and second identifiers in the identifier list is started; and a wireless communication device that receives the system information transmitted from the base station device, selects the first or second identifier from the identifier list included in the system information, and makes a connection request to the base station device on the basis of the selected first or second identifier. Therefore, there is an effect of building the private network corresponding to the second identifier according to the control information from the control device so that the private network is connected from the wireless communication device.

Furthermore, in the second aspect, the wireless communication device may establish a PDU session associated with the first or second identifier with the first core network through the first backhaul line. Therefore, there is an effect of connecting the wireless communication device and the first core network.

Furthermore, in the second aspect, the base station device may be further connected to a second core network through a second backhaul line, and the wireless communication device may establish at least one of a PDU session associated with the first identifier with the first core network, or a PDU session associated with the second identifier with the second core network. Therefore, there is an effect of connecting the wireless communication device and the second core network.

Furthermore, in the second aspect, the base station device may further delete the first identifier from the identifier list according to the control information, and start notifying system information including the second identifier in the identifier list, and the wireless communication device may select the second identifier from the identifier list included in the system information, and make the connection request to the base station device on the basis of the selected second identifier. Therefore, there is an effect of building the isolated private network corresponding to the second identifier according to the control information from the control device so that the private network is connected from the wireless communication device.

Furthermore, in the second aspect, the base station device may be further connected to a second core network through a second backhaul line, and the wireless communication device may establish a PDU session associated with the second identifier with the second core network. Therefore, there is an effect of connecting the wireless communication device and the second core network.

Furthermore, in the second aspect, in a state of notifying the system information including the first and second identifiers in the identifier list, the base station device may delete the second identifier from the identifier list according to the control information from the control device, and start notifying system information including only the first identifier in the identifier list. Therefore, there is an effect of releasing the private network corresponding to the second identifier according to the control information from the control device.

Furthermore, a third aspect of the present technology is a wireless communication device in which an identifier set including a set of identifiers not assigned to a network identifier is defined in advance, including: a holding unit that holds information associated with the identifier set; an acquisition unit that acquires system information notified from the base station device; a comparison unit that compares an identifier included in an identifier list of the system information acquired by the acquisition unit with an arbitrary identifier in the identifier set held in the holding unit; and an identification unit that identifies an identifier determined to match by the comparison unit, as the first identifier, in which an attach procedure is performed to a core network device belonging to the first identifier. Therefore, there is an effect of connecting the wireless communication device to the core network device belonging to the identified first identifier.

Furthermore, in the third aspect, the holding unit may further hold information associated with an arbitrary second identifier that has already been assigned as the network identifier, the wireless communication device may further include a selection unit that selects the second identifier held in the holding unit, the comparison unit may compare an identifier included in the identifier list of the system information acquired by the acquisition unit with the second identifier selected by the selection unit, and the attach procedure may be performed to the core network device belonging to the first identifier identified by the identification unit. Therefore, there is an effect of connecting the wireless communication device to the core network device with an identifier that matches the second identifier.

Furthermore, in the third aspect, the identifier set may be defined in any area unit.

BRIEF DESCRIPTION OF DRAWINGS

FIG. 12 is a diagram showing an example of PLMN-ID that can be assigned for the private network in the embodiment of the present technology.

FIG. 13 is a diagram showing an example of a set of PLMN-IDs that can be assigned for the private network in the embodiment of the present technology.

MODE FOR CARRYING OUT THE INVENTION

Hereinafter, embodiments for carrying out the present technology (hereinafter referred to as embodiments) will be described. The explanation will be given in the following order.

Figure 1:
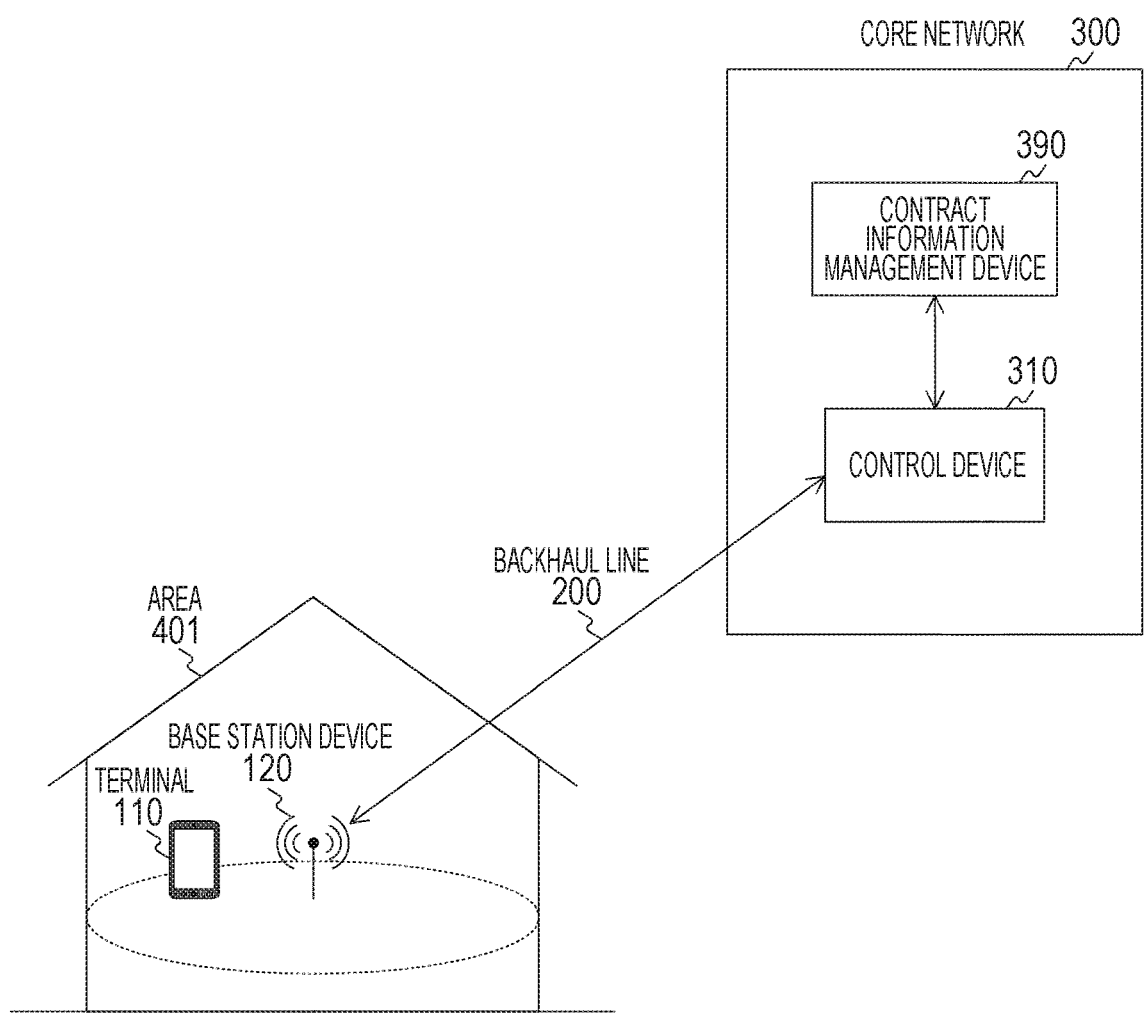
FIG. 1 is a configuration example of a wireless communication system according to a first embodiment of the present technology.

1. First embodiment (example of private network building using core network)
2. Second embodiment (example of private network building using localized core network)
3. Third embodiment (example of building isolated private network using core network)
4. Fourth embodiment (example of building isolated private network using localized core network)
5. Fifth embodiment (example of private network building utilizing IAB)
6. Sixth embodiment (example of building a plurality of private networks)
7. Private network identifier 1. First Embodiment Wireless Communication System FIG. 1 is a configuration example of a wireless communication system according to a first embodiment of the present technology.

The wireless communication system includes a terminal 110, a base station device 120, and a core network 300. The terminal 110 is a user terminal used by a user. The base station device 120 is a base station that provides a network connection to the terminal 110 in an area 401. The base station device 120 is connected to the core network 300 through a backhaul line 200.

The backhaul line 200 is a line that relays an access line of the base station device 120 and a backbone line of the core network 300 by wireless or wired.

The core network 300 is a backbone network constituting a public network, and for example, an evolved packet core (EPC) or a 5G core network (5G next generation core) is assumed. The core network 300 includes a control device 310 and a contract information management device 390.

The control device 310 is a device that controls access, authentication, and the like of the core network 300, and is one device or one function constituting the core network 300 operating as a part of the public network. A function of the control device 310 corresponds to an access and mobility management function (AMF), for example, in a 5G system.

The contract information management device 390 is a device that manages contract information associated with the core network 300, and is one device or one function that constitutes the core network 300.

Operation

Figure 2:
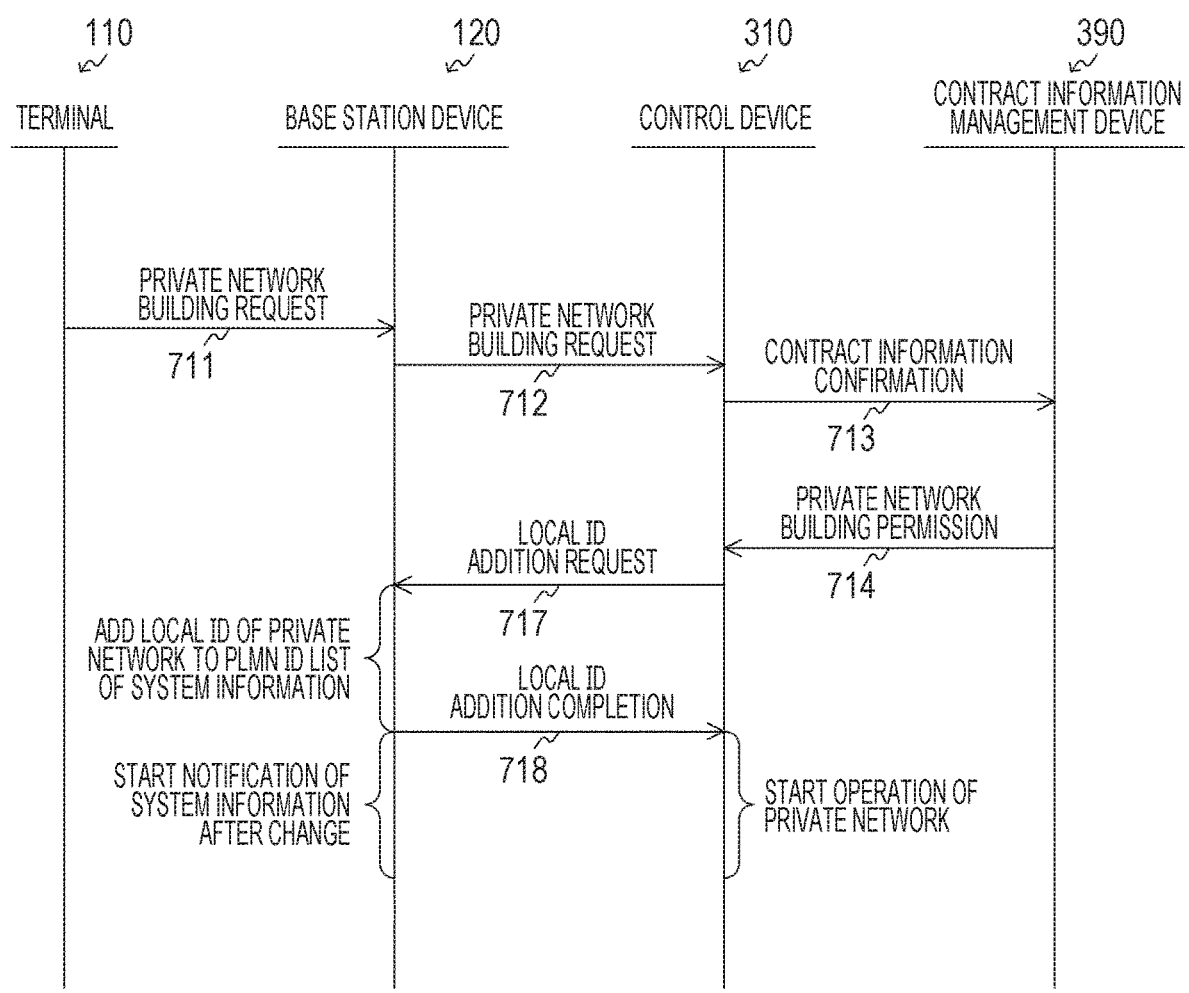
FIG. 2 is a signaling flow showing a processing example for building a private network of the wireless communication system according to the first embodiment of the present technology.

FIG. 2 is a signaling flow showing a processing example for building the private network of the wireless communication system according to the first embodiment of the present technology.

Before the private network is built, it is assumed that the base station device 120 is operating in a public land mobile network (PLMN). At this time, the terminal 110 can use a communication service of "PLMN1" that is the public network by having a subscription contract of PLMN-ID "PLMN1".

The terminal 110 sends a request message for building the private network to the control device 310 through the base station device 120 (711 and 712). Here, the terminal 110 may have the subscription contract necessary for operating in the public network in advance. The terminal 110 holds information associated with the subscription contract, for example, a universal subscriber identity module (USIM). Therefore, authentication is performed with the contract information management device 390 through the control device 310. Note that the terminal 110 is an example of the wireless communication device described in the claims.

The control device 310 sends a message for requesting to confirm whether or not the terminal 110 has a right to build the private network on the basis of the contract information to the contract information management device 390 (713).

When the contract information management device 390 determines that the terminal 110 has the right to build the private network, it sends a message permitting the private network building to the control device 310 (714).

The control device 310 sends a message including an instruction to add a local ID for the private network to a PLMN-ID list included in system information to be notified, to the base station device 120 (717). Here, as the system information notified by the base station device 120, for example, system information block type 1 (SIB1) in long term evolution (LTE) or SIB1 in new radio (NR) is assumed.

When the base station device 120 adds "PLMNprivate" that is the local ID for the private network to the PLMN-ID list, it returns a message notifying that addition of the local ID for the private network is completed, to the control device 310 (718). Then, the base station device 120 starts notifying the system information including the PLMN-ID list to which the local ID for the private network is added. That is, the base station device 120 simultaneously notifies the "PLMN1" that is the ID for the public network and the "PLMNprivate" that is the local ID for the private network.

Therefore, the base station device 120 will simultaneously support a public communication service of the "PLMN1" that is a public PLMN-ID and a private communication service of the "PLMNprivate" that is a private PLMN-ID.

Here, the base station device 120 may preset an allocation range of radio resources for each PLMN. That is, "PLMN1" traffic is scheduled within a range of radio resources pre-allocated to the "PLMN1", while "PLMNprivate" traffic is scheduled within a range of radio resources pre-allocated to the "PLMNprivate". The allocation range of radio resources for each PLMN may be set in units of physical resource block (PRB). Furthermore, the allocation range of radio resources for each PLMN may be changed dynamically.

Note that the public PLMN-ID is an example of a first identifier described in the claims. Furthermore, the private PLMN-ID is an example of a second identifier described in the claims.

The core network 300 establishes a protocol data unit (PDU) session for each PLMN-ID for the terminal 110 through the backhaul line 200. For example, in a case where the terminal 110 requests the public communication service, the core network 300 operates as part of the public network and establishes the PDU session belonging to the "PLMN1".

On the other hand, in a case where the terminal 110 requests the private communication service, when the terminal 110 performs an attach procedure to the core network 300 operating as part of the private network, the core network 300 establishes the PDU session belonging to the "PLMNprivate".

Here, the private communication service is set so that only limited equipment or device such as the terminal 110 used in a specific area 401 can be used. The limited device may be managed under the subscription contract.

Furthermore, the PDU session belonging to the "PLMN1" and the PDU session belonging to the "PLMNprivate" may be terminated by different devices in the core network 300. The different devices correspond to, for example, a data network (DN) in the 5G core network. That is, the PDU session belonging to the "PLMN1" is terminated at DN1, and the PDU session belonging to the "PLMNprivate" is terminated at DN2.

Figure 3:
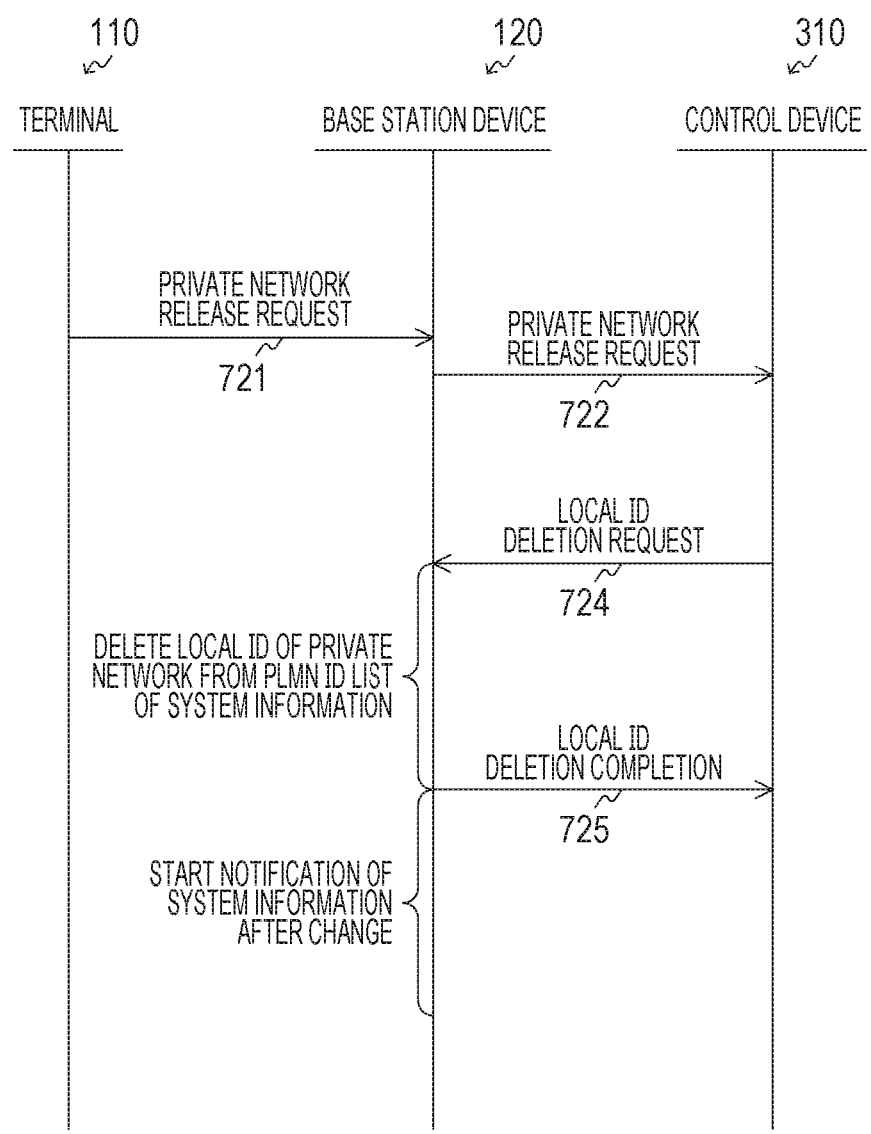
FIG. 3 is a signaling flow showing a processing example for releasing the private network of the wireless communication system according to the first embodiment of the present technology.

FIG. 3 is a signaling flow showing a processing example for releasing the private network of the wireless communication system according to the first embodiment of the present technology.

The terminal 110 operating in the private network sends a request message for releasing the private network to the control device 310 through the base station device 120 (721, 722).

Upon receiving the request message for releasing the private network, the control device 310 sends a message including an instruction to delete the local ID for the private network from the PLMN-ID list of the system information to be notified, to the base station device 120 (724).

When the base station device 120 deletes the "PLMNprivate" that is the local ID for the private network from the PLMN-ID list, it returns a message for notifying that deletion of the local ID for the private network is completed, to the control device 310 (725). Furthermore, the base station device 120 starts notifying the system information including only the "PLMN1" that is the ID for the public network in the PLMN-ID list.

As described above, in the first embodiment of the present technology, the control device 310 in the core network 300 requests the addition of the local ID for the private network on the basis of a request from the terminal 110. Therefore, the local ID for the private network can be added to the system information from the base station device 120, and the terminal 110 can be connected to the private network.

2. Second Embodiment

In the first embodiment described above, the core network 300 is operated as part of the private network. In this case, a delay time may be required depending on arrangement of the core network 300. Therefore, in this second embodiment, the core network for the private network is newly arranged to reduce delay with the core network.

Wireless Communication System

Figure 4:
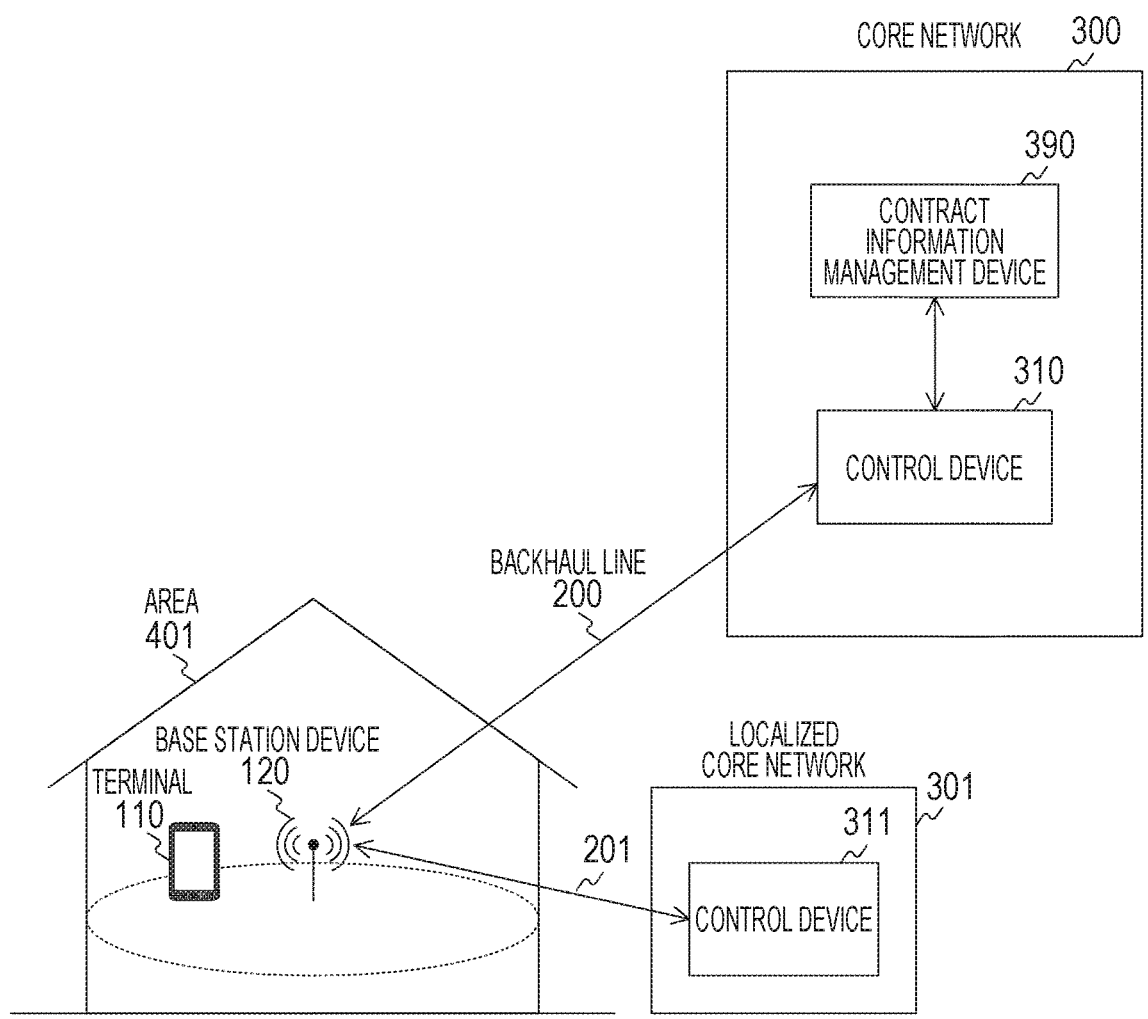
FIG. 4 is a configuration example of the wireless communication system according to a second embodiment of the present technology.

FIG. 4 is a configuration example of the wireless communication system according to the second embodiment of the present technology.

The base station device 120 simultaneously supports the public communication service of the "PLMN1" that is the public PLMN-ID and the private communication service of the "PLMNprivate" that is the private PLMN-ID. Here, the base station device 120 may preset the allocation range of radio resources for each PLMN. That is, the "PLMN1" traffic is scheduled within the range of radio resources pre-allocated to the "PLMN1", while the "PLMNprivate" traffic is scheduled within the range of radio resources pre-allocated to the "PLMNprivate". The allocation range of radio resources for each PLMN may be set in units of physical resource block (PRB).

Furthermore, the allocation range of radio resources for each PLMN may be changed dynamically. When the terminal 120 performs the attach procedure to the core network 300 operating as part of the public network, the core network 300 establishes the PDU session belonging to the "PLMN1" that is the public PLMN-ID to the terminal 110 through the backhaul line 200.

On the other hand, when the terminal 110 performs the attach procedure to a localized core network 301 operating as part of the private network, the localized core network 301 establishes the PDU session belonging to the "PLMNprivate" that is the private PLMN-ID to the terminal 110 through a backhaul line 201.

Here, the private communication service is set so that only limited equipment or device such as the terminal 110 used in a specific area 401 can be used. The limited device may be managed under the subscription contract. For example, the terminal 110 may be set by USIM to use only network belonging to the "PLMNprivate". In this case, the terminal 110 can set only cells belonging to the "PLMNprivate" as target cells for cell selection and reselection.

Here, the localized core network 301 is not connected to an external network such as the Internet in order to ensure security as the private network. On the other hand, the terminal 110, which needs to be connected to the external network, can be connected to the external network such as the Internet through the backhaul line 200 of the public network. Furthermore, the localized core network 301 controls routing of closed communications within the private network through the base station device 120 between two terminals that use the private network.

Moreover, the base station device 120 may manage the radio resources for device to device (D2D) communication between the two terminals that use the private network. Specifically, the base station device 120 sets a resource pool for the D2D communication, and notifies each terminal that performs D2D communication of information associated with the resource pool. Furthermore, the base station device 120 may allocate the radio resources from the resource pool to each terminal that performs D2D communication through radio resource control signaling (RRC signaling).

With such a configuration, the private network and the public network are separated at a core network level corresponding to the PLMN-ID. Here, in order for the private network to provide a local communication environment and the communication service, the backhaul line 201 may include a local cloud server called an edge server, an edge computing server, or the like. The equipment or the device such as the terminal 110 operating in the private network can use services in form of software as a service (SaaS), platform as a service (PaaS), or infrastructure as a service (IaaS) provided by the local cloud server.

Moreover, the backhaul line 201 and the localized core network 301 may be implemented on demand by utilizing a technique called virtualization. That is, some or all of various functions of the core network required on general-purpose hardware may be implemented on demand along with building of the private network.

Furthermore, use of various services provided by the local cloud server may be managed on the basis of the subscription contract. That is, types of cloud services that can be used are limited on the basis of the subscription contract.

Operation

Figure 5:
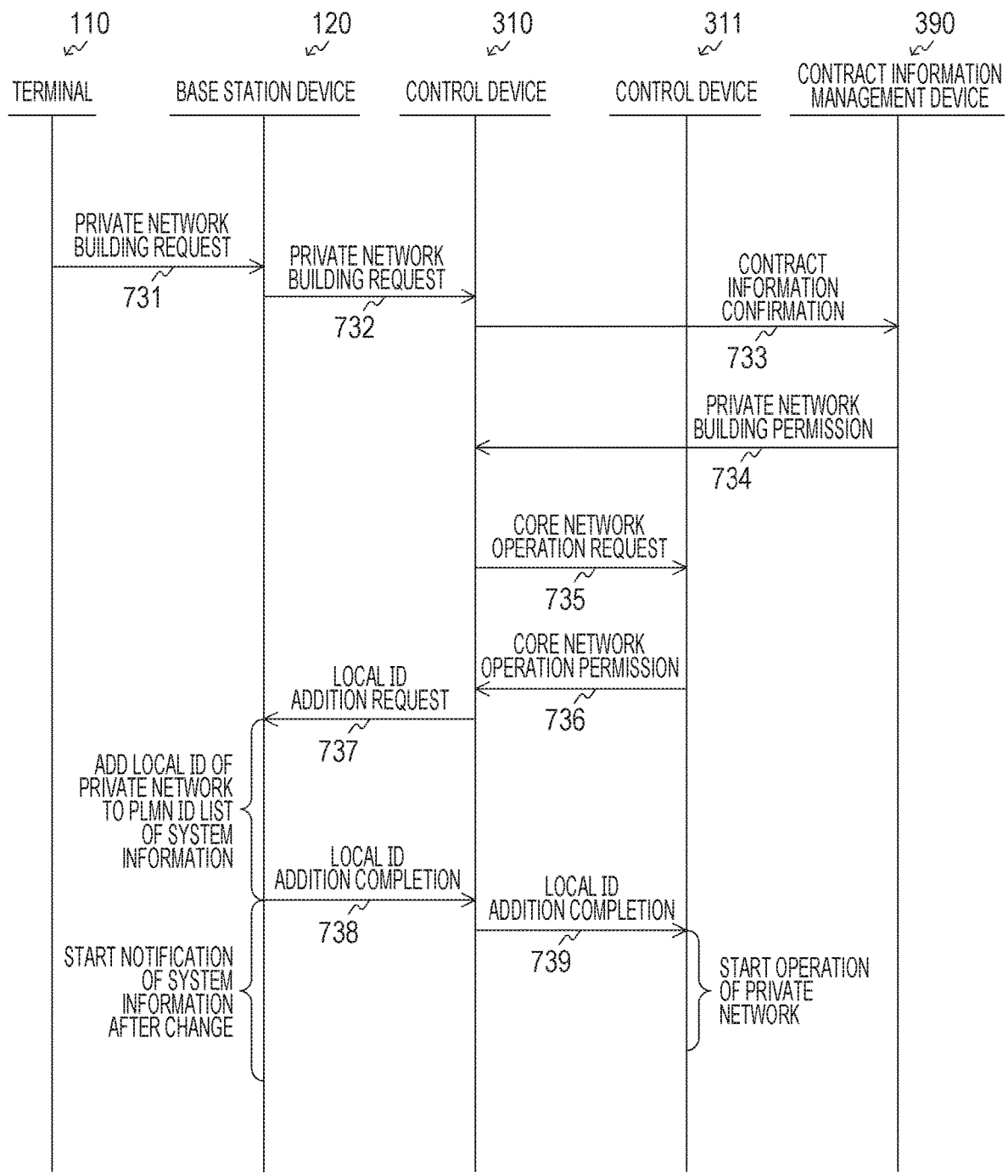
FIG. 5 is a signaling flow showing a processing example for building the private network of the wireless communication system according to the second embodiment of the present technology.

FIG. 5 is a signaling flow showing a processing example for building the private network of the wireless communication system according to the second embodiment of the present technology.

The terminal 110 sends a request message for building the private network to the control device 310 through the base station device 120 (731 and 732). Here, the terminal 110 has the subscription contract in advance that allows the communication service of the "PLMN1" that is the public network to be used. The control device 310 is one device or one function that constitutes the core network 300 operating as a part of the public network.

The control device 310 sends a message for confirming whether or not the terminal 110 has the right to build the private network on the basis of terms of the subscription contract or license and services agreement (LSA) to the contract information management device 390 (733).

When the contract information management device 390 determines that the terminal 110 has the right to build the private network, it sends the message permitting the private network building to the control device 310 (734). The control device 310 sends a message for requesting that the localized core network 301 operates as the core network of the private network to a control device 311 (735). In response, the control device 311 returns a message permitting the request to the control device 310 (736). Here, the control device 311 is one device or one function that constitutes the localized core network 301 operating as part of the private network.

The control device 310 sends the message including the instruction to add the local ID for the private network to the PLMN-ID list included in the system information to be notified, to the base station device 120 (737). Here, as the system information notified by the base station device 120, for example, system information block type 1 (SIB1) in long term evolution (LTE) or SIB1 in new radio (NR) is assumed.

When the base station device 120 adds the "PLMNprivate" that is the local ID for the private network to the PLMN-ID list, it returns the message notifying that the addition of the local ID for the private network is completed, to the control device 310 (738).

The control device 310 forwards the message notifying that the addition of the received local ID for the private network is completed to the control device 311 (739). Therefore, the localized core network 301 starts operating as the core network of the private network.

The base station device 120 starts notifying the system information including the PLMN-ID list to which the local ID for the private network is added. That is, the base station device 120 simultaneously notifies the "PLMN1" that is the ID for the public network and the "PLMNprivate" that is the local ID for the private network.

In this example, the terminal 110 sends the request message (731) for the private network building, but the present invention is not limited to this. For example, the control device 311 or the like, which is any device or function constituting the localized core network 301 operating as part of the private network, may send the request message for the private network building. In a case where the control device 311 is configured to send the request message for the private network building, the terminal 110 may be set to use only the network belonging to the "PLMNprivate".

Furthermore, instead of adding the local ID for the private network to the PLMN-ID list of the system information, the base station device 120 may be instructed to start operation of a new cell with a spectrum different from that of the public network, for example, a spectrum dedicated to the private network (dedicated spectrum). In this case, instead of an instruction 737 to add the local ID for the private network, an instruction to start the operation of the new cell by the spectrum dedicated to the private network may include at least information associated with a cell ID of the new cell and the spectrum.

The base station device 120 starts notifying the system information of the new cell different from the public network when the operation of the new cell for the private network starts. Here, the dedicated spectrum may be a TV whitespace or a spectrum that can be used under a frequency sharing system called a spectrum access system (SAS) that is about to be started in North America. The control device 311 or the control device 310 requests for use of the spectrum at least in a desired frequency band and transmission power, to a TV whitespace database server or a SAS server, and obtains permission to use for a predetermined period as a response.

Furthermore, the dedicated spectrum may also be a specific frequency band allocated for a use case, for example, a radio for industrial equipment in a factory, or a radio for medical equipment in an operating room.

Figure 6:
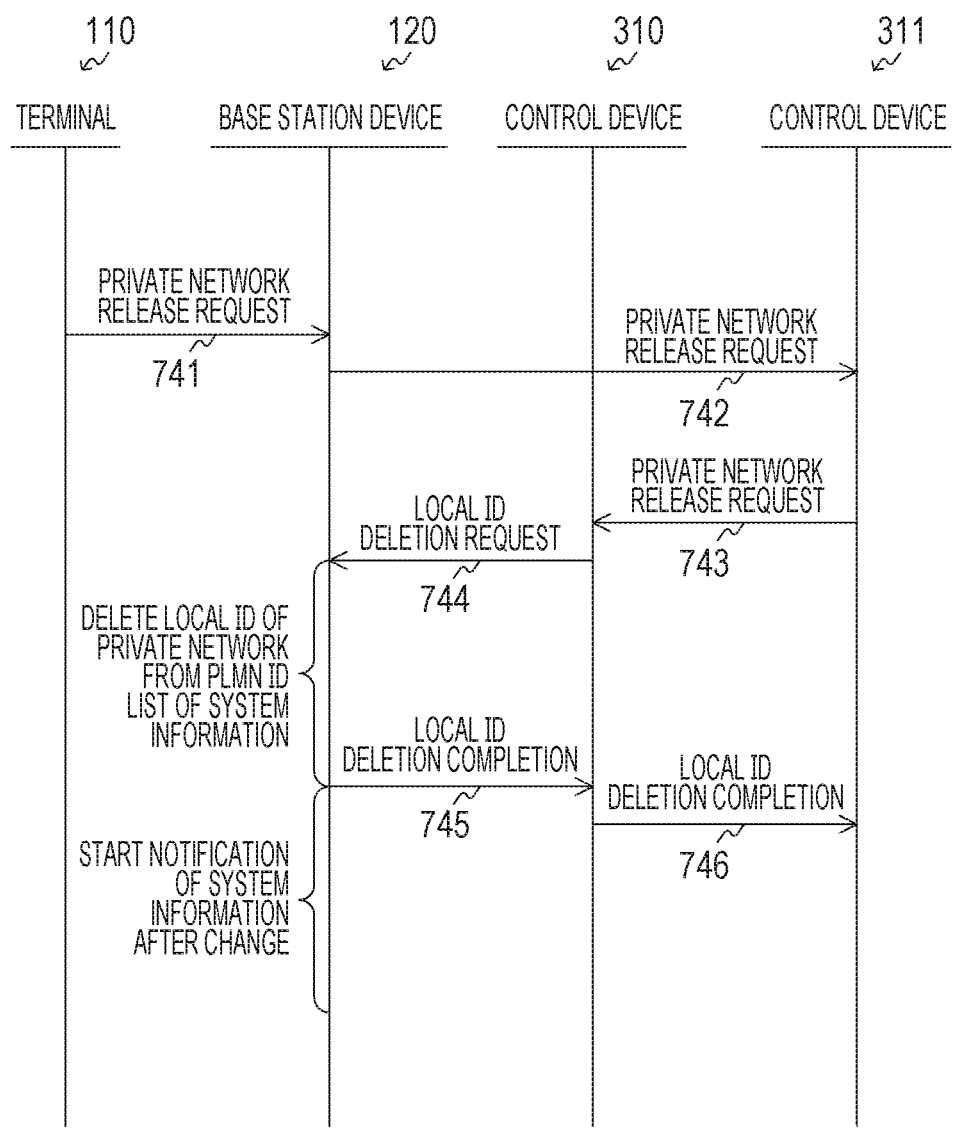
FIG. 6 is a signaling flow showing a processing example for releasing the private network of the wireless communication system according to the second embodiment of the present technology.

FIG. 6 is a signaling flow showing a processing example for releasing the private network of the wireless communication system according to the second embodiment of the present technology.

The terminal 110 operating in the private network sends the request message for releasing the private network to the control device 311 through the base station device 120 (741 and 742).

Upon receiving the request message for releasing the private network, the control device 311 forwards the message to the control device 310 (743). Upon receiving the request message for releasing the private network, the control device 310 sends a message including the instruction to delete the local ID for the private network from the PLMN-ID list included in the system information to be notified, to the base station device 120 (744).

When the base station device 120 deletes the "PLMNprivate" that is the local ID for the private network from the PLMN-ID list, it returns a message notifying that the deletion of the local ID for the private network is completed to the control device 310 (745).

Upon receiving the message notifying that the deletion of the local ID for the private network is completed, the control device 310 forwards the message to the control device 311 (746).

Therefore, the base station device 120 starts notifying the system information including only the "PLMN1" that is the ID for the public network in the PLMN-ID list.

Note that the control device 311 may send the request message for releasing the private network. Prior to sending the request message for releasing the private network, in order to suppress a new connection request to the communication service of the "PLMNprivate", the control device 311 may set a restriction (barring) on setting of the "PLMNprivate" of the base station device 120. Setting of this restriction may be made via the control device 310. For example, during a period until the "PLMNprivate" that is the local ID for the private network is deleted from the PLMN-ID list, as access control information, information including set access class barring (ACB) is notified through the system information. Furthermore, during the period until the "PLMNprivate" that is the local ID for the private network is deleted from the PLMN-ID list, the control device 311 may perform admission control that rejects the connection request to the communication service of the "PLMNprivate". Here, the control device 311 includes, for example, a mobility management entity (MME) function of the EPC, or the AMF and a session management function (SMF) of the 5G core network.

As described above, according to the second embodiment of the present technology, the delay in the private network can be reduced by arranging the localized core network 301 near the base station device 120.

3. Third Embodiment

In the first embodiment described above, by building the private network, the base station device 120 simultaneously notifies the ID for the public network and the local ID for the private network. On the other hand, depending on use of the private network, it may be desired to build the private network isolated from the public network. Therefore, it is possible to block the private net from outside and prevent risks such as hacking. In this third embodiment, a method for building the isolated private network will be described in a configuration of the first embodiment.

Operation

Figure 7:
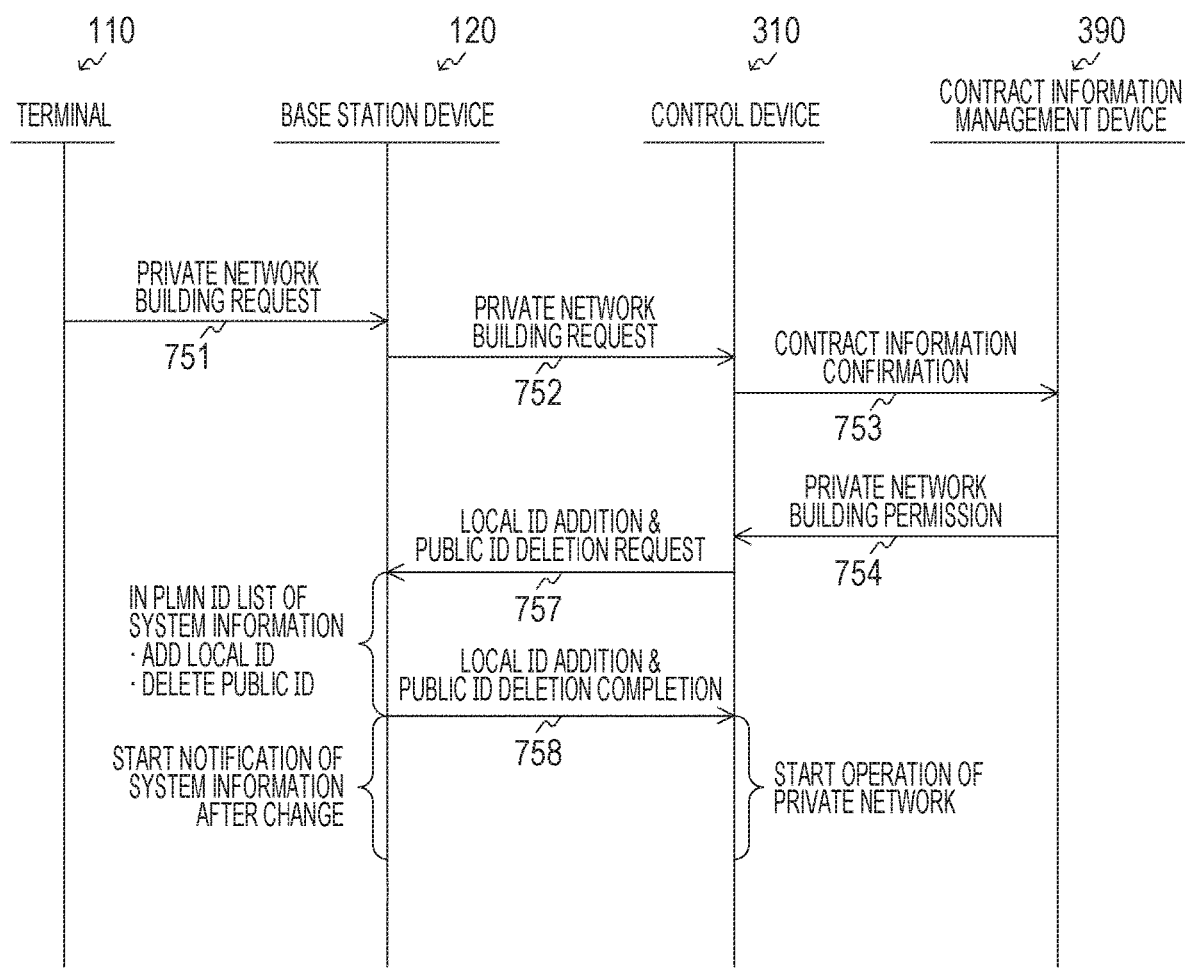
FIG. 7 is a signaling flow showing a processing example for building the private network of the wireless communication system according to a third embodiment of the present technology.

FIG. 7 is a signaling flow showing a processing example for building the private network of the wireless communication system according to the third embodiment of the present technology.

The terminal 110 sends the request message for building the private network to the control device 310 through the base station device 120 (751 and 752). Here, the terminal 110 may have the subscription contract necessary for operating in the public network in advance. The terminal 110 holds the information associated with the subscription contract, for example, the USIM. Therefore, authentication is performed with the contract information management device 390 through the control device 310.

The control device 310 sends a message for requesting to confirm whether or not the terminal 110 has the right to build the private network on the basis of the contract information to the contract information management device 390 (753).

When the contract information management device 390 determines that the terminal 110 has the right to build the private network, it sends the message permitting the private network building to the control device 310 (754).

The control device 310 sends a message including an instruction to add the local ID for the private network to the PLMN-ID list included in the system information to be notified, and to delete the ID for the public network from the PLMN-ID list, to the base station device 120 (757).

The base station device 120 adds the "PLMNprivate" that is the local ID for the private network to the PLMN-ID list, and deletes the ID for the public network from the PLMN-ID list. Then, the base station device 120 returns a message notifying that the addition of the local ID for the private network and the deletion of the ID for the public network are completed, to the control device 310 (758).

Thereafter, the base station device 120 starts notifying the system information including the PLMN-ID list to which the local ID for the private network is added. At this time, the PLMN-ID list of system information does not include the ID for the public network. That is, the base station device 120 starts operating as a base station device of the private network belonging only to the "PLMNprivate" that is the local ID for the private network.

Furthermore, instead of adding the local ID for the private network to the PLMN-ID list of the system information, the base station device 120 may be instructed to start operation of the new cell with the spectrum different from that of the public network, for example, the spectrum dedicated to the private network. In this case, instead of an instruction 757 to add the local ID for the private network, the instruction to start the operation of the new cell with the spectrum dedicated to the private network may include at least the information associated with the cell ID of the new cell and the spectrum.

The base station device 120 starts notifying the system information of the new cell different from the public network when the operation of the new cell for the private network starts. Here, the dedicated spectrum may be the TV whitespace or the spectrum that can be used under the frequency sharing system called the SAS that is about to be started in North America. The control device 310 requests for use of the spectrum at least in the desired frequency band and transmission power, to the TV whitespace database server or the SAS server, and obtains permission to use for the predetermined period as the response.

Furthermore, the dedicated spectrum may also be a specific frequency band allocated for a use case, for example, a radio for industrial equipment in a factory, or a radio for medical equipment in an operating room.

As described above, according to the third embodiment of the present technology, it is possible to build the private network isolated from the public network in the configuration of the first embodiment.

4. Fourth Embodiment

In the third embodiment described above, the isolated private network is built in the configuration of the first embodiment, but similarly, the isolated private network can also be built in the configuration of the second embodiment. In this fourth embodiment, the method for building the isolated private network will be described in the configuration of the second embodiment.

Operation

Figure 8:
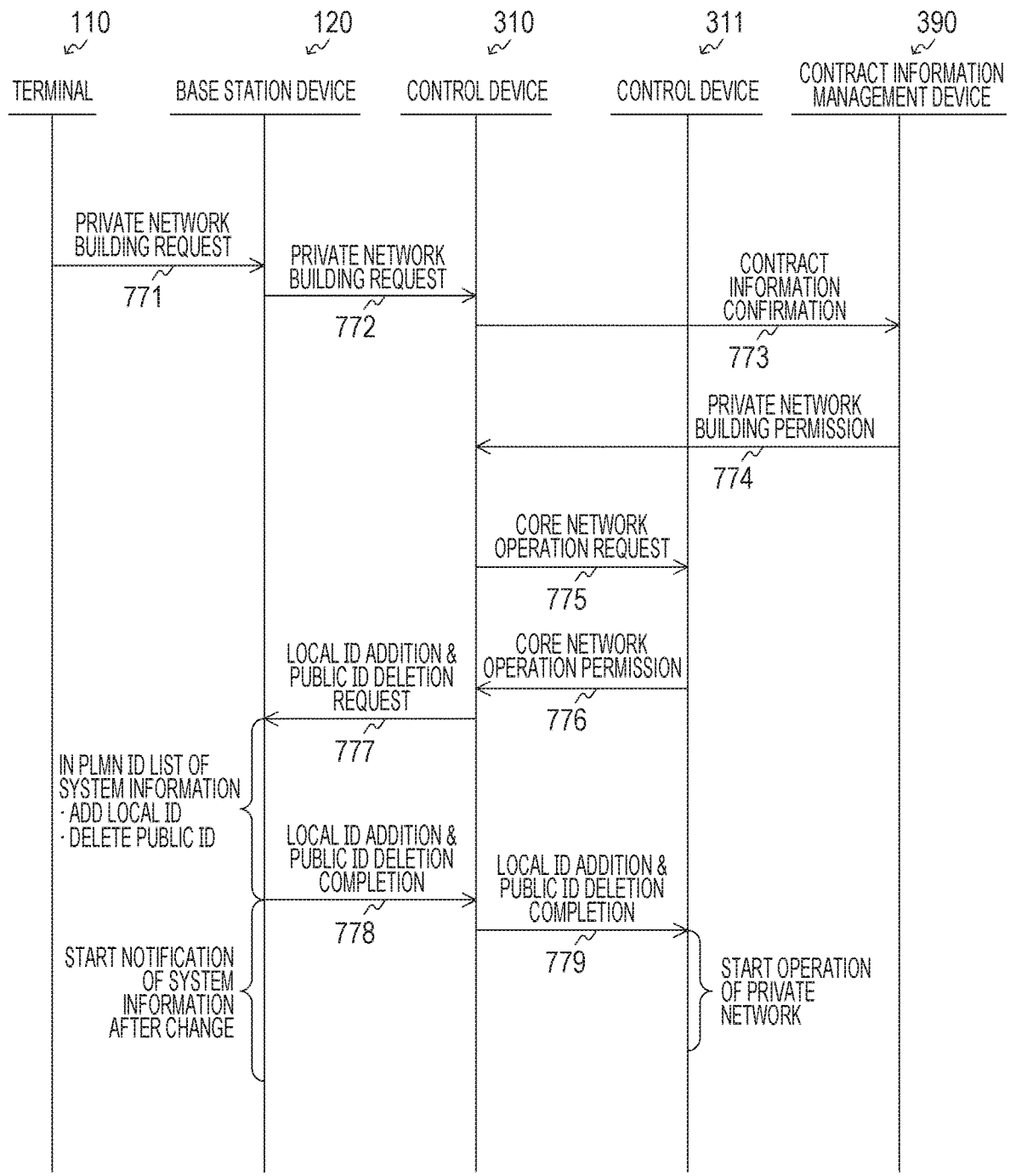
FIG. 8 is a signaling flow showing a processing example for building the private network of the wireless communication system according to a fourth embodiment of the present technology.

FIG. 8 is a signaling flow showing a processing example for building the private network of the wireless communication system according to the fourth embodiment of the present technology.

The terminal 110 sends the request message for building the private network to the control device 310 through the base station device 120 (771 and 772). Here, the terminal 110 has the subscription contract in advance that allows the communication service of the "PLMN1" that is the public network to be used. The control device 310 is one device or one function that constitutes the core network 300 operating as a part of the public network.

The control device 310 sends the message for confirming whether or not the terminal 110 has the right to build the private network on the basis of the terms of the subscription contract or the LSA to the contract information management device 390 (773).

When the contract information management device 390 determines that the terminal 110 has the right to build the private network, it sends the message permitting the private network building to the control device 310 (774). The control device 310 sends the message for requesting that the localized core network 301 operates as the core network of the private network to the control device 311 (775). In response, the control device 311 returns the message permitting the request to the control device 310 (776).

The control device 310 sends the message including the instruction to add the local ID for the private network to the PLMN-ID list included in the system information to be notified, and to delete the ID for the public network from the PLMN-ID list, to the base station device 120 (777).

When the base station device 120 adds the "PLMNprivate" that is the local ID for the private network to the PLMN-ID list, it returns the message notifying that the addition of the local ID for the private network is completed, to the control device 310 (778).

The base station device 120 adds the "PLMNprivate" that is the local ID for the private network to the PLMN-ID list, and deletes the ID for the public network from the PLMN-ID list. Then, the base station device 120 returns the message notifying that the addition of the local ID for the private network and the deletion of the ID for the public network are completed, to the control device 310 (778).

The control device 310 forwards the message notifying that the addition of the received local ID for the private network and the deletion of the ID for the public network, to the control device 311 (779). Therefore, the localized core network 301 starts operating as the core network of the private network.

Thereafter, the base station device 120 starts notifying the system information including the PLMN-ID list to which the local ID for the private network is added. At this time, the PLMN-ID list of system information does not include the ID for the public network. That is, the base station device 120 starts operating as a base station device of the private network belonging only to the "PLMNprivate" that is the local ID for the private network.

Furthermore, instead of adding the local ID for the private network to the PLMN-ID list of the system information, the base station device 120 may be instructed to start operation of the new cell with the spectrum different from that of the public network, for example, the spectrum dedicated to the private network. In this case, instead of an instruction 777 to add the local ID for the private network, the instruction to start the operation of the new cell with the spectrum dedicated to the private network may include at least the information associated with the cell ID of the new cell and the spectrum.

The base station device 120 starts notifying the system information of the new cell different from the public network when the operation of the new cell for the private network starts. Here, the dedicated spectrum may be the TV whitespace or the spectrum that can be used under the frequency sharing system called the SAS that is about to be started in North America. The control device 311 or the control device 310 requests for use of the spectrum at least in the desired frequency band and transmission power, to the TV whitespace database server or the SAS server, and obtains permission to use for the predetermined period as the response.

Furthermore, the dedicated spectrum may also be a specific frequency band allocated for a use case, for example, a radio for industrial equipment in a factory, or a radio for medical equipment in an operating room.

Note that, in this example, the terminal 110 sends the request message for the private network building, but the present invention is not limited to this. For example, the control device 311 or the like, which is any device or function constituting the localized core network 301 operating as part of the private network, may send the request message for the private network building. In a case where the control device 311 is configured to send the request message for the private network building, the terminal 110 may be set to use only the network belonging to the "PLMNprivate".

Through these procedures, the base station device 120 will support only the private communication service of the "PLMNprivate" that is the private PLMN-ID. The core network 300 operates as part of the public network and maintains the backhaul line 200 with the base station device 120 for the purpose of control.

On the other hand, when the terminal 120 performs the attach procedure to the localized core network 301 operating as part of the private network, the localized core network 301 establishes the PDU session belonging to the "PLMNprivate" that is the private PLMN-ID with the terminal 110 through the backhaul line 201.

Here, the private communication service is set so that only limited equipment or device such as the terminal 110 used in a specific area 401 can be used. The limited device may be managed under the subscription contract.

Furthermore, in order to provide the local communication environment and the communication service in the private network, the backhaul line 201 may include the local cloud server called the edge server, the edge computing server, or the like. The equipment or the device such as the terminal 110 operating in the private network can use the services in the form of SaaS, PaaS, or IaaS provided by the local cloud server.

Moreover, the backhaul line 201 and the localized core network 301 may be implemented on demand by utilizing a technique called virtualization. That is, some or all of various functions of the core network required on general-purpose hardware may be implemented on demand along with building of the private network.

Furthermore, use of various services provided by the local cloud server may be managed on the basis of the subscription contract. That is, types of cloud services that can be used are limited on the basis of the subscription contract.

As described above, according to the fourth embodiment of the present technology, it is possible to build the private network isolated from the public network in the configuration of the second embodiment.

5. Fifth Embodiment

In the above-described embodiment, it is assumed that the base station device 120 and the core network 300 are connected by the wired backhaul line 200. On the other hand, in 5G, an integrated access and backhaul (IAB) technology that utilizes millimeter waves used for communication between the terminal and the base station as a backhaul is being discussed. In the fifth embodiment, the IAB is utilized in the configuration of the second embodiment to build the private network.

Wireless Communication System

Figure 9:
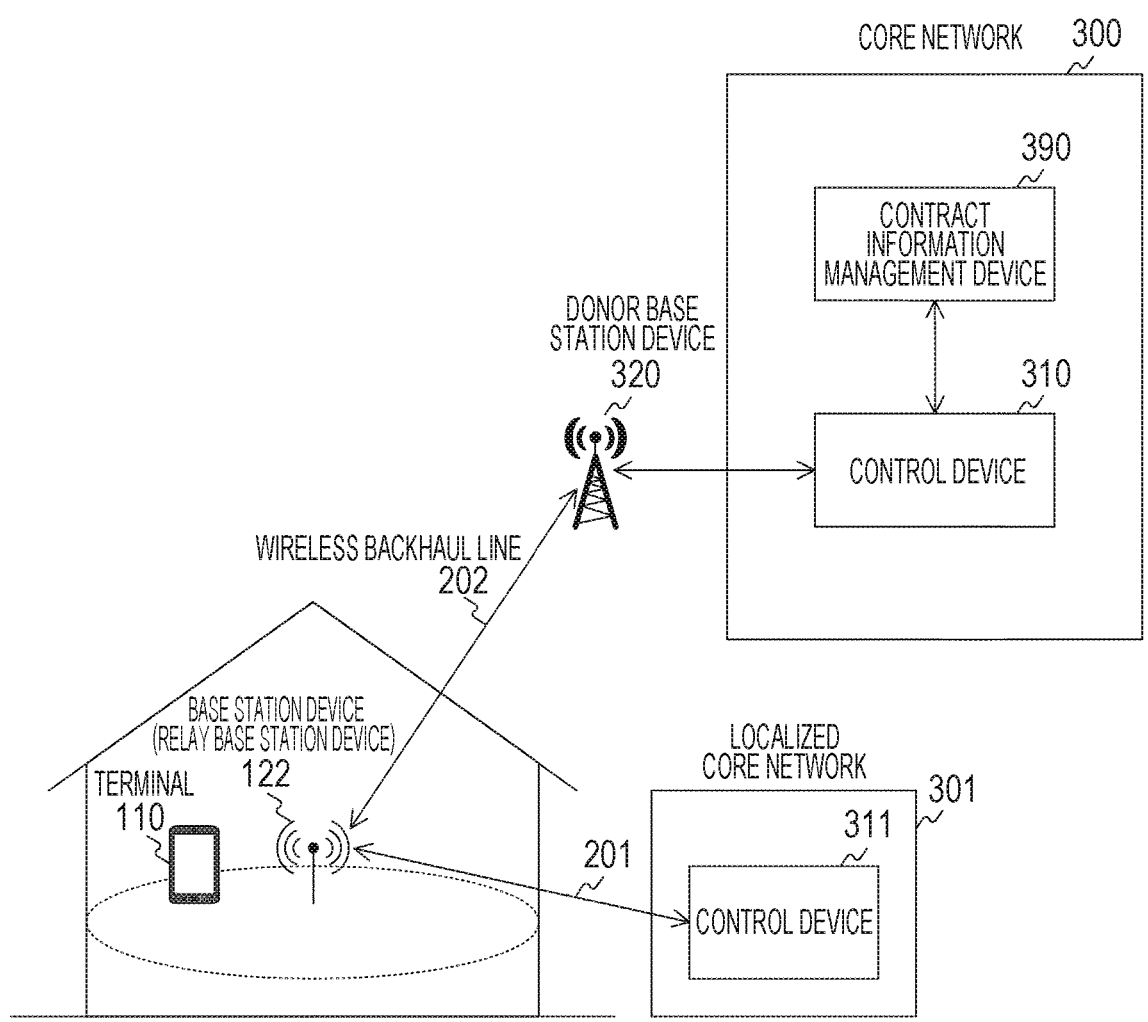
FIG. 9 is a configuration example of the wireless communication system according to a fifth embodiment of the present technology.

FIG. 9 is a configuration example of the wireless communication system according to the fifth embodiment of the present technology.

In the fifth embodiment, in addition to the configuration of the second embodiment, a donor base station device 320 is provided. The donor base station device 320 is a base station device connected to the core network 300. The donor base station device 320 establishes a wireless backhaul line 202 with a base station device 122 operating as a relay base station device. Therefore, the base station device 122 is connected to the core network 300 through the donor base station device 320.

The base station device 122 can build the private network by a similar procedure as that of the second embodiment described above.

Furthermore, the base station device 122 can utilize a multi-hop technology to establish a multi-hop wireless backhaul line 202 with the donor base station device 320 through another relay base station device (not shown).

In a case where the IAB technology is used, the relay base station acts like the terminal to the donor base station or a parent relay base station, and acts as the base station to a child relay base station or the terminal. At this time, the relay base station has a mobile termination (MT) function and a distributed unit (DU) function. That is, the function of the terminal in the relay base station establishes the wireless backhaul line with the donor base station that is the base station.

As described above, according to the fifth embodiment of the present technology, the base station device 122 can be connected to the core network 300 by using the wireless backhaul line 202 with the donor base station device 320.

6. Sixth Embodiment

In the above-described embodiment, it is assumed that one private network is built, but a plurality of private networks may be built. In this sixth embodiment, the wireless communication system in which the plurality of private networks is built will be described.

Wireless Communication System

Figure 10:
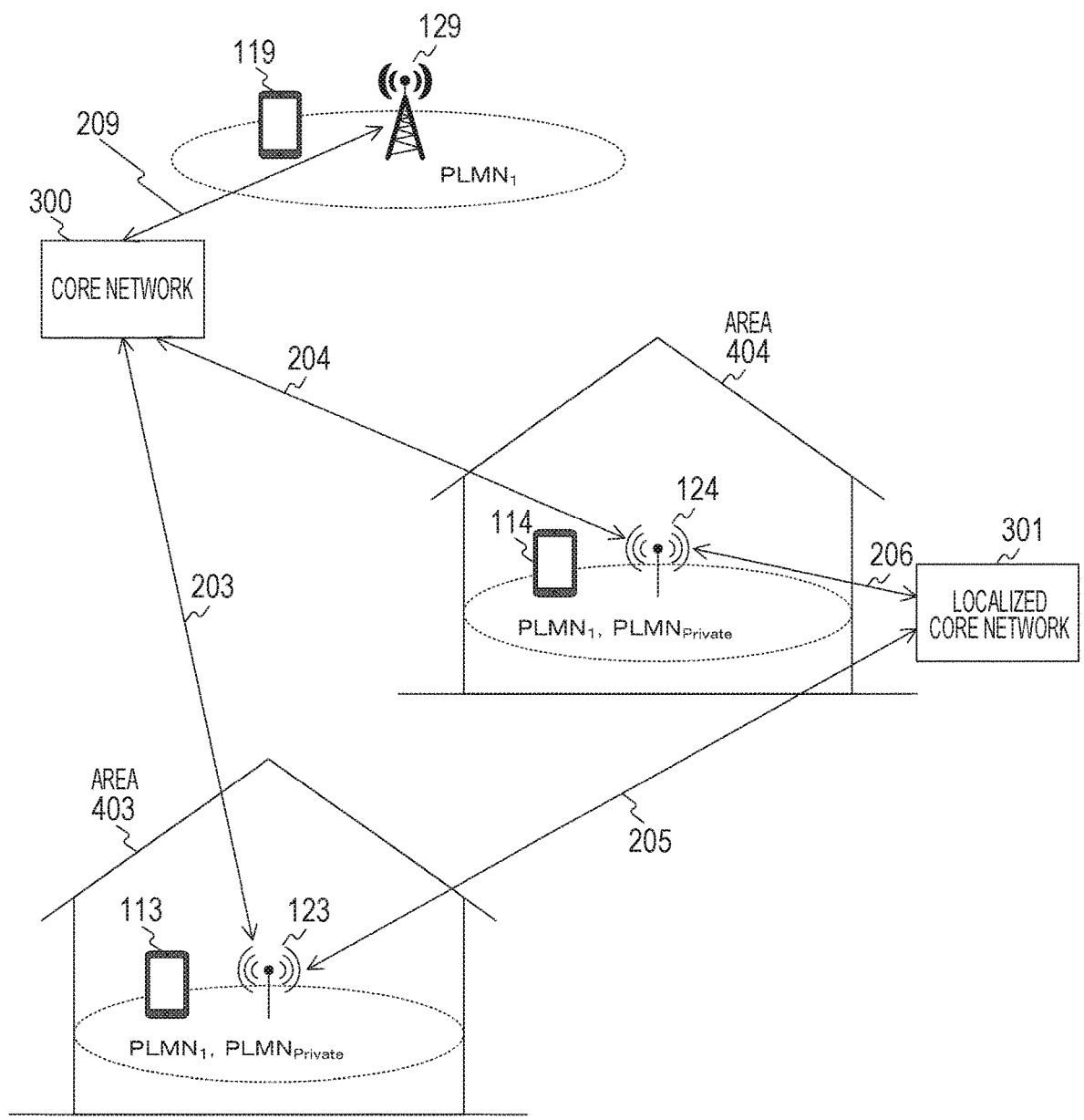
FIG. 10 is a configuration example of the wireless communication system according to a sixth embodiment of the present technology.

FIG. 10 is a configuration example of the wireless communication system according to the sixth embodiment of the present technology.

Note that, in this example, two private networks having the same PLMN ("PLMNprivate") are built, but three or more private networks may be built, and each network may have a different PLMN (for example, "PLMNprivate1", "PLMNprivate2", or the like).

The base station device 124 is connected to the core network 300 through the backhaul line 204 for the public network, and constitutes the public network belonging to the "PLMN1". Furthermore, the base station device 124 is connected to the localized core network 301 through the backhaul line 206 for the private network, and constitutes the private network belonging to the "PLMNprivate". The terminal 114 in an area 404 can use the private network belonging to the "PLMNprivate" through the base station device 124.

The base station device 123 is connected to the core network 300 through the backhaul line 203 for the public network, and constitutes the public network belonging to the "PLMN1". Furthermore, the base station device 123 is connected to the localized core network 301 through the backhaul line 205 for the private network, and constitutes the private network belonging to the "PLMNprivate". The terminal 113 in an area 403 can use the private network belonging to the "PLMNprivate" through the base station device 123.

The base station device 129 is connected to the core network 300 through the backhaul line 209 for the public network, and constitutes the public network belonging to the "PLMN1". The terminal 119 can use the public network belonging to the "PLMN1" through the base station device 129.

The localized core network 301 controls routing of closed communication in the private network through the base station device 124 or the base station device 123 between the terminals (for example, terminals 113 and 114) in the private network.

Furthermore, the localized core network 301 performs mobility management when the terminal moves within a coverage area provided by a plurality of base station devices in the private network, for example, mobility management including a handover process.

In this example, one localized core network 301 controls communication in the private network through the two base station devices 123 and 124, but some of the functions of the localized core network 301 may be distributed to each base station device. For example, in order to reduce delay, the local cloud server called the edge server, the edge computing server, or the like is placed close to each base station device, and arithmetic processing related to the closed communication in each base station device may be performed in a distributed manner by each cloud server. Furthermore, as some of the functions of the localized core network 301 described above, for example, a user plane function (UPF) and the DN may be distributed close to each base station device to minimize a communication path between two terminals communicating through the same base station device. Moreover, this distributed arrangement may be dynamically implemented by utilizing virtualization technology.

Here, it is assumed that the area 404 is in the factory, the area 403 is in a control room, and a device for operating the terminal 114 provided in a robot working in the factory is the terminal 113 in the control room. At this time, the localized core network 301 may centrally control communication exchanged between the terminals 113 and 114 in relation to control of the robot.

Furthermore, it is assumed that the area 404 is in the operating room, examination room, or patient's room, the area 403 is in the control room, and a device for operating the terminal 114 included in the medical equipment or a medical device that are provided in the operating room, the examination room, or the patient's room is the terminal 113 in the control room. At this time, the localized core network 301 may centrally control the communication exchanged between the terminals 113 and 114 in relation to control of the medical equipment or the medical device.

As described above, according to the sixth embodiment of the present technology, the plurality of private networks can be built.

7. Private Network Identifier

The ID (identifier) for the private network in the above-described embodiment is an identifier for local use that does not overlap with any PLMN-ID. A private network identifier is identified by the terminal 110 as follows.

Figure 11:
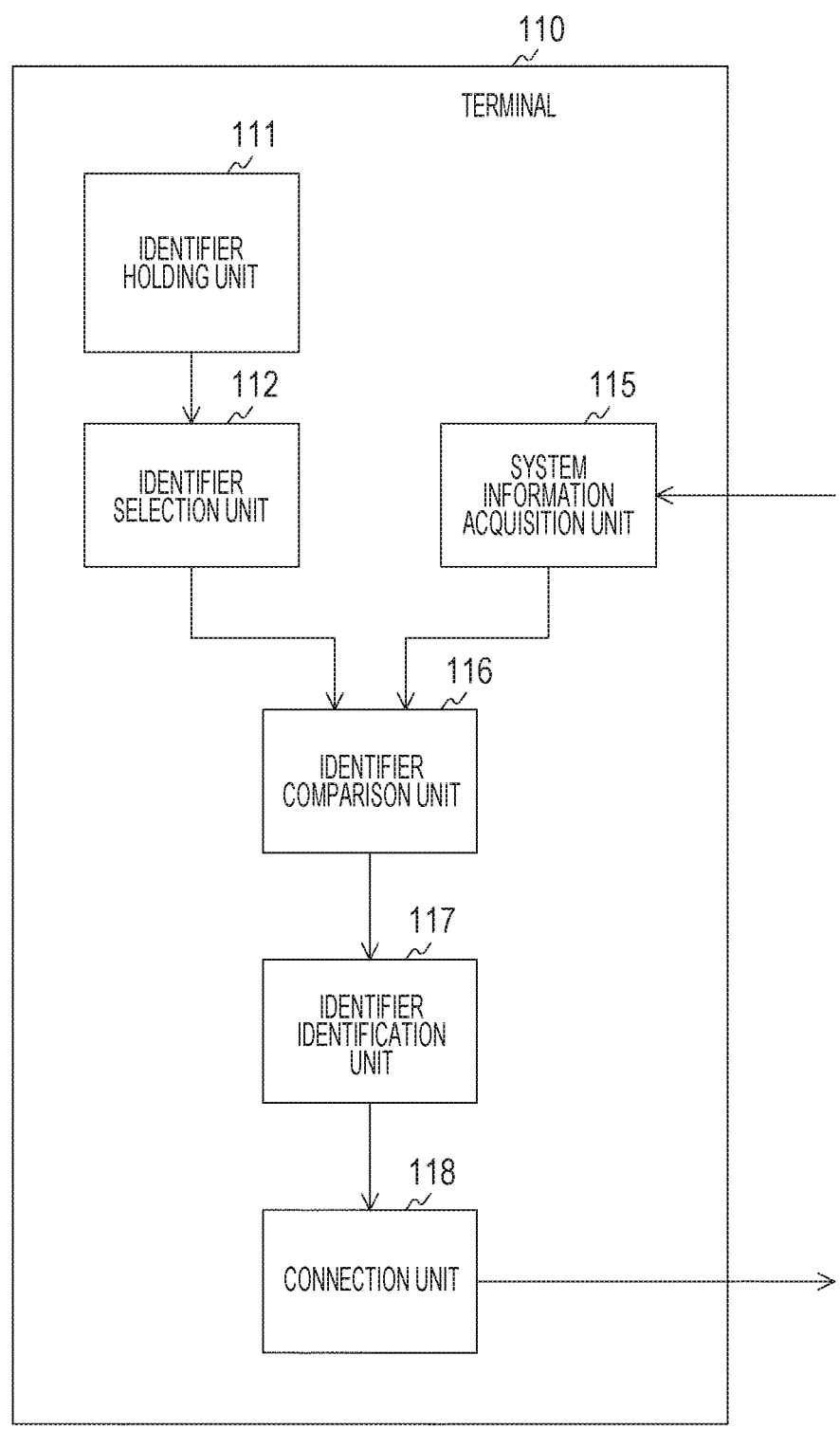
FIG. 11 is a diagram showing a configuration example of a terminal 110 according to an embodiment of the present technology.

FIG. 11 is a diagram showing a configuration example of the terminal 110 according to the embodiment of the present technology.

The terminal 110 includes an identifier holding unit 111, an identifier selection unit 112, a system information acquisition unit 115, an identifier comparison unit 116, an identifier identification unit 117, and a connection unit 118.

The identifier holding unit 111 holds information associated with an identifier set including a set of identifiers that are not assigned to network identifiers. The identifier selection unit 112 selects the private network identifier held in the identifier holding unit 111. The system information acquisition unit 115 acquires the system information notified from the base station device. The identifier comparison unit 116 compares an identifier included in the PLMN-ID list of system information acquired by the system information acquisition unit 115 with an arbitrary identifier in the identifier set held in the identifier holding unit 111. The identifier identification unit 117 identifies the identifier determined to match by the identifier comparison unit 16, as the private network identifier. The connection unit 118 performs the attach procedure to connect to the core network 300 or the localized core network 301 that belongs to the private network identifier identified by the identifier identification unit 117.

Figure 13:
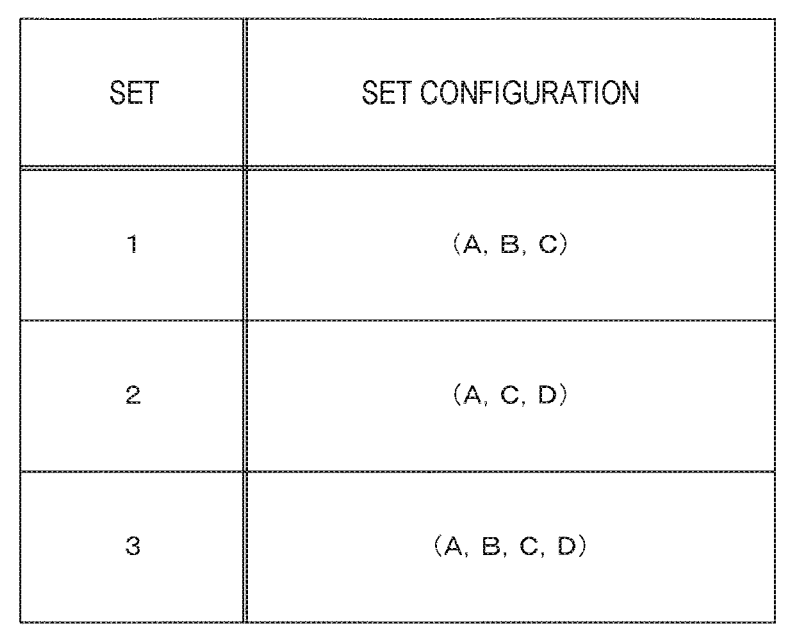

The private network identifier may have a predefined range of numbers that can be used. For example, as shown in FIG. 12, the PLMN-ID that can be assigned for the private network may be defined for each set by a range from a start number to an end number. In this example, a combination of mobile country code (MCC) and mobile network code (MNC) is assumed as the PLMN-ID. Furthermore, as shown in FIG. 13, a set in which a plurality of sets is combined may be used as a PLMN-ID candidate set for the private network.

Moreover, the device (for example, terminal 110 or control device 311) that initiates the private network building, the control device (for example, control device 310 or 311) that receives the request for the private network building, or the base station device (base station device 120) may randomly select the identifier from the predefined range of numbers. That is, the identifier may be identified autonomously from the identifier set.

Furthermore, after confirming the ID used as the private network by the surrounding base station devices as a self-optimizing network (SON), a unique identifier may be selected and set. Here, the above-mentioned local use identifier may be defined in units of any area, for example, country, prefecture, or city.

The above-mentioned process of the private network building may be diverted to neutral host network (NHN) building. The private network is set so that only limited devices can be used in the specific area, while the NHN is set so that any device can be used in the specific area. Furthermore, a known identifier may be assigned in advance to the NHN ID added to the PLMN-ID list. Moreover, the private network may be referred to as a non-public network (NPN), or may be a name of an identifier (NPN ID) for the NPN corresponding to the ID for the private network.

Note that the above-described embodiment shows an example for implementing the present technology, and matters in the embodiment and invention-specifying matters in the claims have a corresponding relationship with each other. Similarly, the invention-specifying matters in the claims and the matters in the embodiment of the present technology having the same name have a corresponding relationship with each other. However, the present technology is not limited to the embodiment, and can be implemented by applying various modifications to the embodiment without departing from the gist of the present technology.

Furthermore, a processing procedure described in the above-described embodiment may be regarded as a method having the series of procedures, and may be regarded as a program for causing a computer to execute the series of procedures, or as a recording medium for storing the program. As the recording medium, for example, a compact disc (CD), minidisc (MD), digital versatile disc (DVD), memory card, Blu-ray (registered trademark) disc and the like can be used.

Note that effects described in the present specification are merely examples and are not limited, and other effects may be obtained.

Note that the present technology can have the following configurations.

(1) A base station device, in which in a state of notifying system information including a first identifier corresponding to a first communication network in an identifier list, a second identifier used locally is added to the identifier list according to control information from a control device, and notification of the system information including the first and second identifiers in the identifier list is started.

(2) The base station device according to the above (1), in which the control information includes information associated with the second identifier and a command instructing to add the second identifier to the identifier list.

(3) The base station device according to the above (1) or (2), in which in a state of notifying the system information including the first and second identifiers in the identifier list, the second identifier is deleted from the identifier list according to the control information from the control device, and notification of the system information that does not include at least the second identifier in the identifier list is started.

(4) The base station device according to the above (3), in which the control information includes information associated with the second identifier and a command instructing to delete the second identifier from the identifier list.

(5) The base station device according to any one of the above (1) to (3), in which according to the control information, the first identifier is further deleted from the identifier list, and notification of the system information including only the second identifier in the identifier list is started.

(6) The base station device according to the above (5), in which the control information includes information associated with the second identifier and a command instructing to add the second identifier to the identifier list and to delete the first identifier from the identifier list.

(7) The base station device according to any one of the above (1) to (6), in which an identifier set including a set of identifiers not assigned to the first identifier is defined in advance, and the second identifier is autonomously identified from the identifier set.

(8) The base station device according to any one of the above (1) to (7), in which an identifier set including a set of identifiers not assigned to the first identifier is defined in advance, it is detected that any identifier included in the identifier set is not used in surrounding base station devices, and on the basis of a detected result, an identifier not used by the surrounding base station devices is identified from the identifier set.

(9) The base station device according to any one of the above (1) to (8), in which the base station device is a relay base station device, and a mobile termination function provided in the relay base station device establishes a wireless backhaul line with a donor base station device so that the relay base station device is connected to the control device through the wireless backhaul line.

(10) A wireless communication system including:
a base station device that is connected to a first core network through a first backhaul line, and in which in a state of notifying system information including a first identifier corresponding to a first communication network in an identifier list, a second identifier used locally is added to the identifier list according to control information from a control device, and notification of the system information including the first and second identifiers in the identifier list is started; and
a wireless communication device that receives the system information transmitted from the base station device, selects the first or second identifier from the identifier list included in the system information, and makes a connection request to the base station device on the basis of the selected first or second identifier.

(11) The wireless communication system according to the above (10),
in which the wireless communication device establishes a PDU session associated with the first or second identifier with the first core network through the first backhaul line.

(12) The wireless communication system according to the above (10) or (11),
in which the base station device is further connected to a second core network through a second backhaul line, and
the wireless communication device establishes at least one of a PDU session associated with the first identifier with the first core network, or a PDU session associated with the second identifier with the second core network.

(13) The wireless communication system according to any one of the above (10) to (12),
in which the base station device further deletes the first identifier from the identifier list according to the control information, and starts notifying system information including the second identifier in the identifier list, and
the wireless communication device selects the second identifier from the identifier list included in the system information, and makes the connection request to the base station device on the basis of the selected second identifier.

(14) The wireless communication system according to the above (13),
in which the base station device is further connected to a second core network through a second backhaul line, and
the wireless communication device establishes a PDU session associated with the second identifier with the second core network.

(15) The wireless communication system according to any one of the above (10) to (14),
in which in a state of notifying the system information including the first and second identifiers in the identifier list, the base station device deletes the second identifier from the identifier list according to the control information from the control device, and starts notifying the system information including only the first identifier in the identifier list.

(16) A wireless communication device in which an identifier set including a set of identifiers not assigned to a network identifier is defined in advance, including:
a holding unit that holds information associated with the identifier set;
an acquisition unit that acquires system information notified from the base station device;
a comparison unit that compares an identifier included in an identifier list of the system information acquired by the acquisition unit with an arbitrary identifier in the identifier set held in the holding unit; and
an identification unit that identifies an identifier determined to match by the comparison unit, as the first identifier, in which an attach procedure is performed to a core network device belonging to the first identifier.

(17) The wireless communication device according to the above (16),
in which the holding unit further holds information associated with an arbitrary second identifier that has already been assigned as the network identifier,
the wireless communication device further includes a selection unit that selects the second identifier held in the holding unit,
the comparison unit compares an identifier included in the identifier list of the system information acquired by the acquisition unit with the second identifier selected by the selection unit, and
the attach procedure is performed to the core network device belonging to the first identifier identified by the identification unit.

(18) The wireless communication device according to the above (16) or (17),
in which the identifier set is defined in any area unit.

REFERENCE SIGNS LIST 110, 113, 114, 119 Terminal
111 Identifier holding unit
112 Identifier selection unit
115 System information acquisition unit
116 Identifier comparison unit
117 Identifier identification unit
118 Connection unit
120, 122 to 124 Base station device
200, 201, 203 to 206 Backhaul line
202 Wireless backhaul line
300 Core network
310, 311 Control device
320 Donor base station device
390 Contract information management device
301 Localized core network

The invention claimed is:
1. A base station device, comprising:
circuitry configured to:
in a state of notification of system information that includes a first identifier corresponding to a first communication network in an identifier list;
add a second identifier used locally to the identifier list according to first control information from a control device; and
start notification of the system information that includes the first identifier and the second identifier in the identifier list; and
in a state of the notification of the system information that includes the first identifier and the second identifier in the identifier list:
delete the second identifier from the identifier list according to second control information from the control device; and
start notification of the system information that does not include at least the second identifier in the identifier list.

2. The base station device according to claim 1, wherein the first control information includes information associated with the second identifier and a command that instructs the addition of the second identifier to the identifier list.

3. The base station device according to claim 1, wherein the second control information includes information associated with the second identifier and a command that instructs the deletion of the second identifier from the identifier list.

4. The base station device according to claim 1, wherein according to third control information from the control device, the circuitry is further configured to:
    delete the first identifier is the identifier list; and
    start notification of the system information including only the second identifier in the identifier list.

5. The base station device according to claim 4, wherein the third control information includes information associated with the second identifier and a command that instructs the addition of the second identifier to the identifier list and the deletion of the first identifier from the identifier list.

6. The base station device according to claim 1, wherein
    an identifier set that includes a set of identifiers not assigned to the first identifier is defined in advance, and
    the second identifier is autonomously identified from the identifier set.

7. The base station device according to claim 1, wherein in a case where an identifier set that includes a set of identifiers not assigned to the first identifier is defined in advance, the circuitry is further configured to:
    detect whether an identifier included in the identifier set is not used in surrounding base station devices; and
    identify the identifier not used by the surrounding base station devices from the identifier set.

8. The base station device according to claim 1, wherein the base station device is a relay base station device, and the relay base station device is configured to establish a wireless backhaul line with a donor base station device using a mobile termination function such that the relay base station device is connected to the control device through the wireless backhaul line.

9. A wireless communication system, comprising:
    a base station device that is connected to a first core network through a first backhaul line, wherein the base station device is configured to:
        in a state of notification of system information that includes a first identifier corresponding to a first communication network in an identifier list:
            add a second identifier used locally to the identifier list according to first control information from a control device; and
            start notification of the system information that includes the first identifier and the second identifier in the identifier list; and
        in a state of the notification of the system information that includes the first identifier and the second identifier in the identifier list:
            delete the second identifier from the identifier list according to second control information from the control device; and
            start the notification of the system information that includes the first identifier in the identifier list; and
    a wireless communication device configured to:
        receive the system information transmitted from the base station device;
        select one of the first identifier or the second identifier from the identifier list included in the system information; and
        make a connection request to the base station device based on the selected one of the first identifier or the second identifier.

10. The wireless communication system according to claim 9, wherein the wireless communication device is further configured to establish a protocol data unit (PDU) session associated with one of the first identifier or the second identifier with the first core network through the first backhaul line.

11. The wireless communication system according to claim 9, wherein
    the base station device is further connected to a second core network through a second backhaul line, and
    the wireless communication device is further configured to establish at least one of a protocol data unit (PDU) session associated with the first identifier with the first core network, or a PDU session associated with the second identifier with the second core network.

12. The wireless communication system according to claim 9, wherein
    the base station device is further configured to:
        delete the first identifier from the identifier list according to third control information; and
        start notification of the system information that includes the second identifier in the identifier list, and
    the wireless communication device is further configured to:
        select the second identifier from the identifier list included in the system information; and
        make the connection request to the base station device based on the selected second identifier.

13. The wireless communication system according to claim 12, wherein
    the base station device is further connected to a second core network through a second backhaul line, and
    the wireless communication device is further configured to establish a protocol data unit (PDU) session associated with the second identifier with the second core network.

14. A wireless communication device in which an identifier set including a set of identifiers not assigned to a network identifier is defined in advance, the wireless communication device comprising:
    a memory configured to store information associated with the identifier set; and
    circuitry configured to:
        acquire system information notified from a base station device;
        compare an identifier included in an identifier list of the acquired system information with an arbitrary identifier in the identifier set; and
        identify a first identifier based on the comparison, wherein
    the memory is further configured to: store information associated with an arbitrary second identifier that has already been assigned as the network identifier, and
    the circuitry is further configured to:
        select the arbitrary second identifier;
        compare the identifier included in the identifier list of the system information with the arbitrary second identifier; and
        perform an attach procedure to connect to a core network device belonging to the first identifier.

15. The wireless communication device according to claim 14, wherein the identifier set is defined in an area unit.

* * * * *